(12) United States Patent
Toba et al.

(10) Patent No.: US 6,402,240 B1
(45) Date of Patent: Jun. 11, 2002

(54) SEAT HAVING PASSENGER'S SITTING POSTURE DETECTING APPARATUS, AND HARNESS WIRING STRUCTURE IN SEAT

(75) Inventors: Eiji Toba, Tochigi-ken; Tetsuya Kayumi, Saitama, both of (JP)

(73) Assignees: TS Tech Co., Ltd.; Honda Giken Kogyo Kabushiki Kaisha, both of (JP)

( * ) Notice: Subject to any disclaimer, the term of this patent is extended or adjusted under 35 U.S.C. 154(b) by 0 days.

(21) Appl. No.: 09/616,442

(22) Filed: Jul. 14, 2000

(30) Foreign Application Priority Data

Jul. 16, 1999 (JP) .......................................... 11-203024
Jul. 16, 1999 (JP) .......................................... 11-203025

(51) Int. Cl.$^7$ ............................................. A47C 31/00
(52) U.S. Cl. ................................. 297/217.3; 340/438
(58) Field of Search ......................... 297/217.3, 216.1; 340/438, 573.7, 573.1

(56) References Cited

U.S. PATENT DOCUMENTS

| | | | | |
|---|---|---|---|---|
| 5,455,494 A | * | 10/1995 | Ogasawara | ................. 318/267 |
| 6,027,138 A | * | 2/2000 | Tanaka et al. | ............... 280/735 |
| 6,116,640 A | * | 9/2000 | Tanaka et al. | ............... 280/735 |
| 6,253,133 B1 | * | 6/2001 | Sakai et al. | ..................... 701/45 |
| 6,263,271 B1 | * | 7/2001 | Oka et al. | ...................... 701/45 |

\* cited by examiner

*Primary Examiner*—Jerry Redman
(74) *Attorney, Agent, or Firm*—Dann, Dorfman, Herrell and Skillman, P.C.

(57) ABSTRACT

Firstly, a passenger's sitting posture detecting apparatus 1 is mounted on a side of a seat back frame 2 and outside of a frame, an opening 10 is formed in a side of a back pad 9 at a location corresponding to that of the passenger's sitting posture detecting apparatus 1, the passenger's sitting posture detecting apparatus 1 is accommodated in the opening 10, a harness 6 is assembled with the passenger's sitting posture detecting apparatus 1 in the opening 10 through a connector 7 such that the harness 6 can be connected to the passenger's sitting posture detecting apparatus 1. Therefore, the harness 6 can be reliably assembled with the passenger's sitting posture detecting apparatus 1 through the connector 7 from outside with a simple operation. Secondary, the harness 6 is held and brought into conduction such that the harness 6 is separated from the edge of the mounting member 14 through a clip 18. With this structure, the harness 16 is held such that the harness 16 does not come in contact with the edge of the mounting member 14.

4 Claims, 9 Drawing Sheets

SEAT HAVING PASSENGER'S SITTING POSTURE DETECTING APPARATUS, AND HARNESS WIRING STRUCTURE IN SEAT

BACKGROUND OF THE INVENTION

The present invention relates to a seat having a passenger's sitting posture detecting apparatus for controlling the operation of an air bag apparatus by detecting whether the sitting passenger is an adult or a child, and the present invention also relates to a harness wiring structure in a seat applied for wiring, through inside of a seat frame, a harness which is electrically connected to apparatuses such as the passenger's sitting posture detecting apparatus and the air bag apparatus.

A seat for an automobile includes, in addition to an air bag apparatus and a passenger sitting state detecting apparatus, a passenger's sitting posture detecting apparatus 1 as shown in FIG. 8 for controlling the operation of the air bag apparatus by detecting whether the sitting passenger is an adult or a child.

The passenger's sitting posture detecting apparatus 1 is of hexahedronal shape for its structural reason, and it is preferable that the passenger's sitting posture detecting apparatus 1 is mounted to a side of a seat back frame 2 because of this shape.

When the passenger's sitting posture detecting apparatus 1 is mounted to the side of the seat back frame 2, since the seat back frame 2 includes a wire frame 3 which is bent in an arc for supporting a side of a back pad (not shown) from behind and which is projected forward from a main side frame 4, the passenger's sitting posture detecting apparatus 1 can be mounted by sandwiching and fixing an apparatus installing plate 5 between the wire frame 3 and the main side frame 4.

In the apparatus installing plate 5, if the passenger's sitting posture detecting apparatus 1 is mounted inward such that the apparatus 1 is directed to inner side from the main side frame 4 of the seat back frame 2, when a connector 7 of a harness 6 is fitted to a socket (not shown) of the passenger's sitting posture detecting apparatus 1, an operator must insert his or her hand inside the seat back frame 2 for operation.

At the time of fitting operation, since it is difficult to see the socket of the passenger's sitting posture detecting apparatus 1 from outside, the operation is extremely troublesome, a connection failure is prone to be generated, and there is the same inconvenience when a periodical check or the like is carried out.

In addition to the problem when the passenger's sitting posture detecting apparatus itself is mounted, when an apparatus such as an air bag apparatus including the passenger's sitting posture detecting apparatus is mounted to the seat, it is necessary to wire the harness 6 which is electrically connected to the apparatus through an interior over which a back spring 8 is stretched from the seat back frame 2.

When the harness 6 is inserted inside of the seat back frame 2, the harness comes in contact with the seat back frame or an edge portion of a constituent member located around the seat back frame, the harness 6 rubs against the edge portion or the like by vibration or the like when the automobile travels, and there is an adverse possibility that an insulation coating film of the harness is ripped.

Therefore, a first object of the present invention is to provided a seat having a passenger's sitting posture detecting apparatus capable of reliably connecting a connector of a harness to the passenger's sitting posture detecting apparatus with a simple operation.

It is a second object of the present invention to provide a harness wiring structure in a seat which can be reliably wired with a simple structure such that the harness of each apparatus does not come in contact with a seat back frame or an edge portion of a constituent member located around the seat back frame.

SUMMARY OF THE INVENTION

According to one aspect of the present invention, there is provided with a seat having a passenger's sitting posture detecting apparatus wherein the passenger's sitting posture detecting apparatus is mounted on a side of a seat back frame and outside of a frame, an opening is formed in a side of a back pad at a location corresponding to that of the passenger's sitting posture detecting apparatus, the passenger's sitting posture detecting apparatus is accommodated in the opening, a harness is assembled with a socket of the passenger's sitting posture detecting apparatus in the opening through a connector such that the passenger's sitting posture detecting apparatus is mounted on a side of a seat back. With this structure, since the passenger's sitting posture detecting apparatus can be seen from outside even in a state in which the back pad is assembled, the connector of the harness can reliably be fitted to the passenger's sitting posture detecting apparatus from outside with a simple operation.

Further, the passenger's sitting posture detecting apparatus is accommodated in the opening of the back plate, the harness is assembled with the passenger's sitting posture detecting apparatus in the opening through the connector such that the opening is covered with a cover which is fitted into the opening. With this structure, it is possible to prevent an impact or the like from being applied to the passenger's sitting posture detecting apparatus from outside, and to prevent recesses or the like from being generated on the trim cover, and the seat back can be assembled with excellent outer appearance.

According to another aspect of the present invention, there is provided a harness wiring structure comprising a clip having a holder for pinching and holding the harness on its axis, a holder arm extended from the holder and located inward of a face from the edge of the mounting member, and a projection provided on a base of the holder arm and fitted and fixed to a plate face of the mounting member, wherein the harness is held and brought into conduction such that the harness is separated from the edge of the mounting member through the clip. Even if vibration or the like is generated when an automobile travels, it is possible to prevent the harness from rubbing an edge of another constituent member including the mounting member located near the harness, and to prevent the harness from being damaged or ripped with a simple structure.

In addition, an engaging pin projecting from an intermediate portion of the holder arm is brought into abutment against the edge of the mounting member to fix the clip so that the clip does not rotate. With this structure, it is possible to completely prevent the harness from coming into contact with an edge of other constituent member including the mounting member.

DETAILED DESCRIPTION OF THE INVENTION

Figure 1:
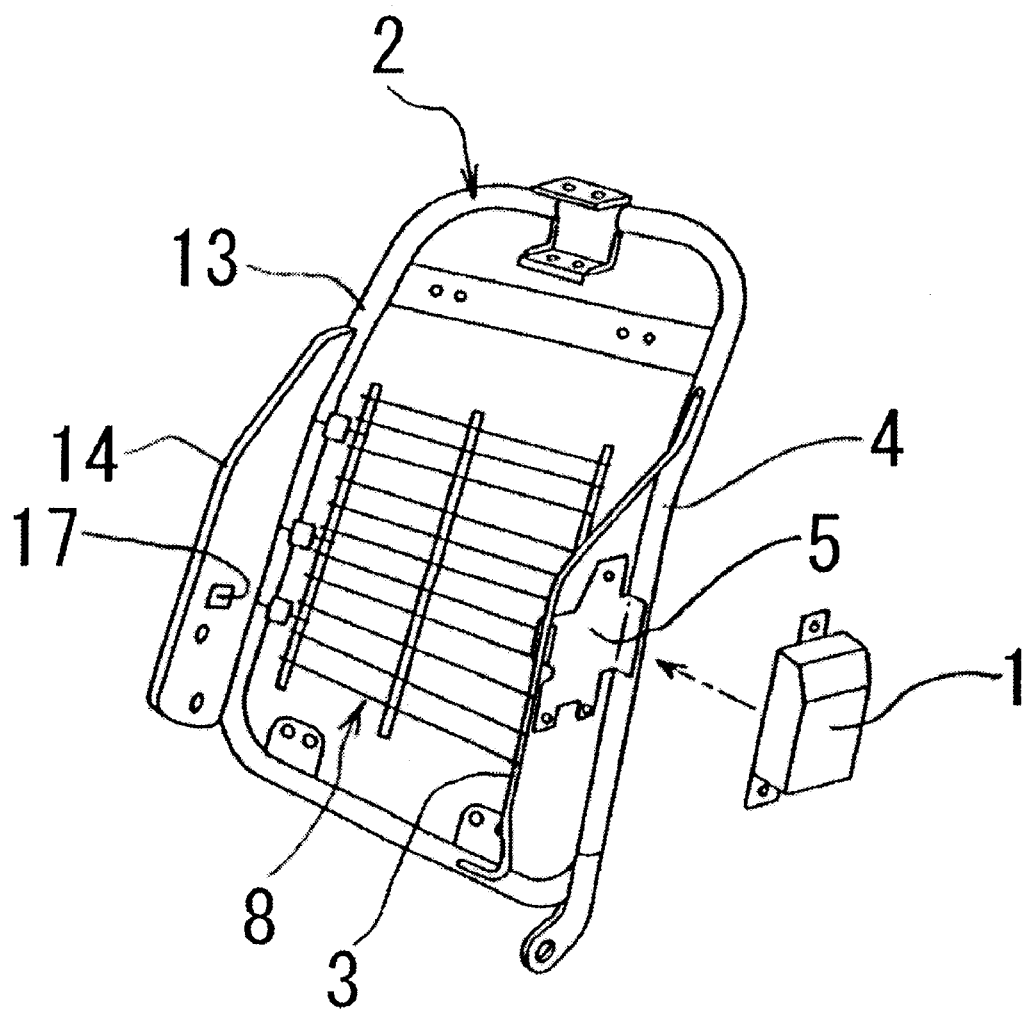
FIG. 1 is a perspective view of a seat back frame of a seat having a passenger's sitting posture detecting apparatus according to the present invention.

Constituent members similar to those described in the background technique will be designated with the same reference numbers. First, a seat having a passenger's sitting posture detecting apparatus will be explained with reference to FIGS. 1 to 4. FIG. 1 shows a seat back frame 2 viewed from the passenger's sitting posture detecting apparatus 1.

The seat back frame 2 includes a wire frame 3 which is bent in an arc for supporting a side of a back pad (not shown) from behind and which is projected forward from a main side frame 4, the passenger's sitting posture detecting apparatus 1 is assembled by sandwiching and fixing an apparatus installing plate 5 between the wire frame 3 and the main side frame 4. The passenger's sitting posture detecting apparatus 1 is mounted by fastening the passenger's sitting posture detecting apparatus 1 securely on an outer plate face of the apparatus installing plate 5 with screws with respect to the seat back frame 2.

Figure 2:
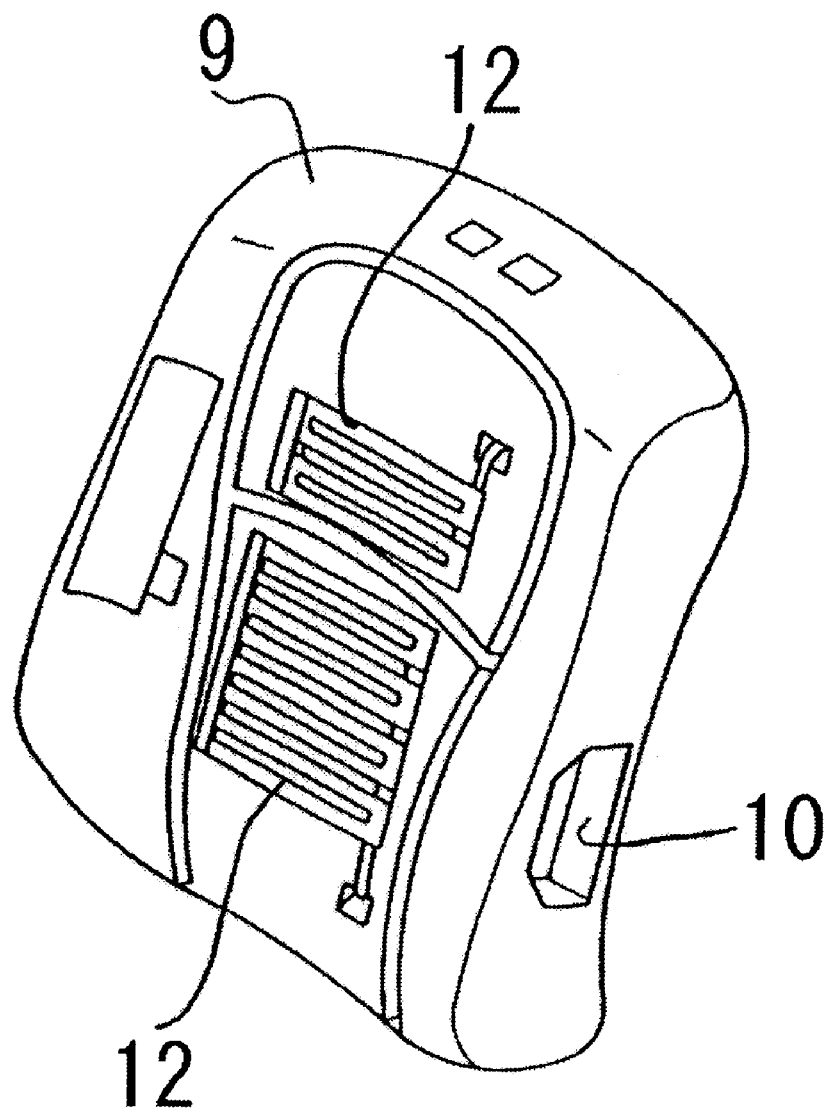
FIG. 2 is a perspective view of a back pad assembled into the seat back frame shown in FIG. 1.
Figure 3:
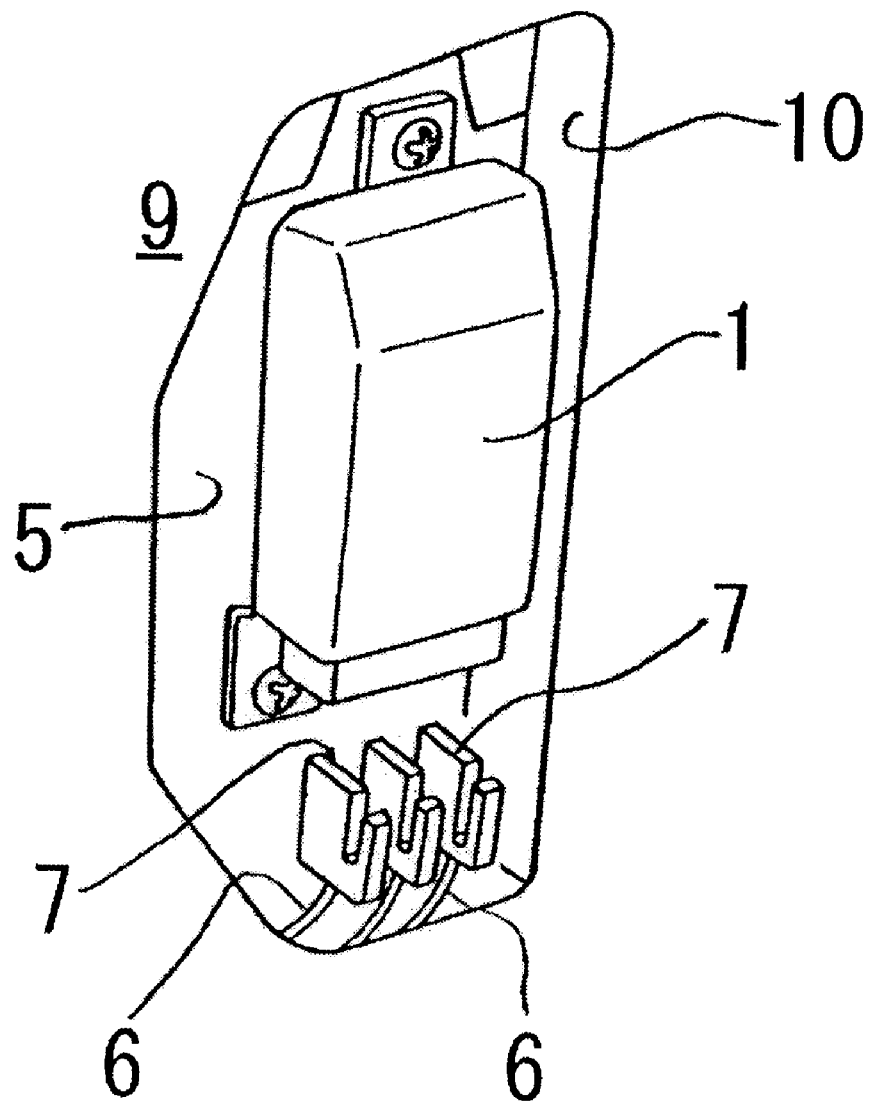
FIG. 3 is a perspective view of partially showing the back pad of the seat having the passenger's sitting posture detecting apparatus 1 of the present invention.

As shown in FIG. 2, the back pad 9 is provided with an opening 10 at location corresponding to that of the passenger's sitting posture detecting apparatus 1. As shown in FIG. 3, the passenger's sitting posture detecting apparatus 1 is accommodated in the opening 10. The opening 10 has an opening area of such a size that a connector 7 of a harness 6 is assembled to a socket (not shown) of the passenger's sitting posture detecting apparatus 1.

In the illustrated embodiment, a lower portion of the passenger's sitting posture detecting apparatus 1 is opened widely so that the connector 7 of the harness 6 can be assembled from the lower side of the socket of the passenger's sitting posture detecting apparatus 1.

The passenger's sitting posture detecting apparatus 1 is mounted outside of the plate face of the apparatus installing plate 5 inside the opening 10 and the passenger's sitting posture detecting apparatus 1 can be seen from outside, and the lower side of the opening 10 is opened widely. Therefore, the harness 6 of the passenger's sitting posture detecting apparatus 1 can reliably be assembled with a simple operation such that the harness 6 can be connected to the connector 7.

Figure 4:
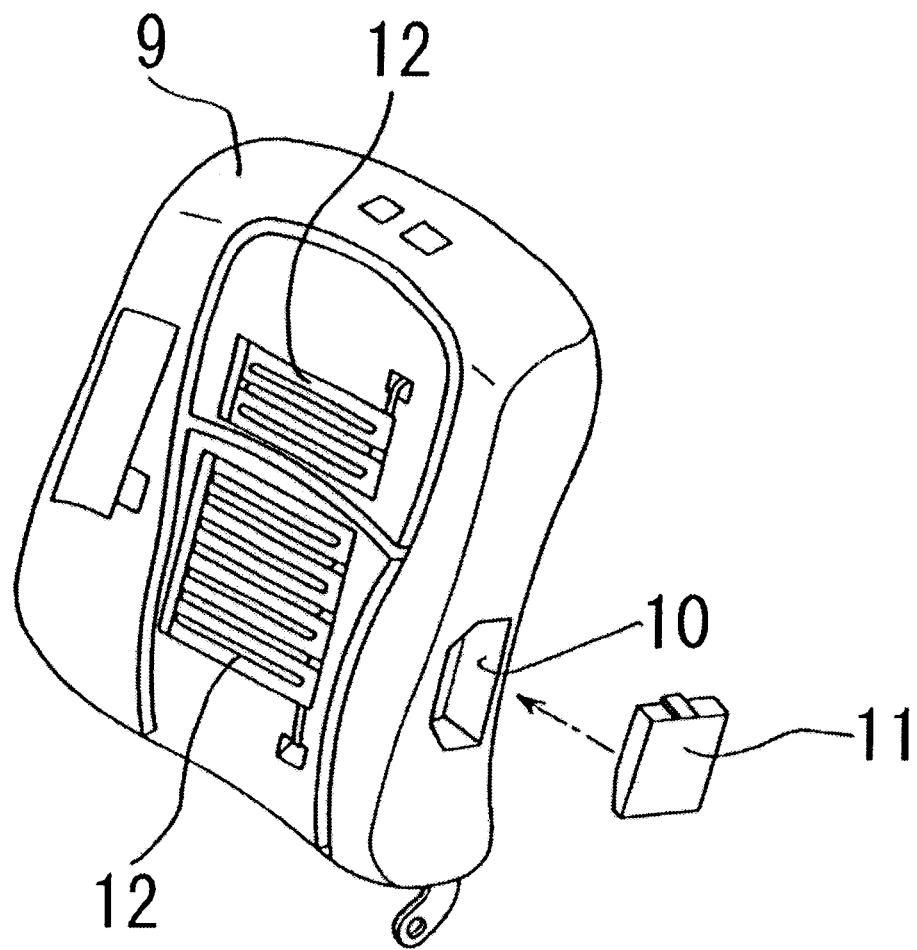
FIG. 4 is a perspective view of the back pad shown in FIG. 2 and a covered fitted into an opening of the back pad.

The passenger's sitting posture detecting apparatus 1 is accommodated in the opening 10 and the connector 7 of the harness 6 is fitted in the opening 10 together with the socket of the passenger's sitting posture detecting apparatus 1 and then, the opening 10 is covered with a cover 11 which is fitted to the opening as shown in FIG. 4, and the back pad 9 for a seat back is assembled. The cover 11 may be made of resin such as polypropylene or foam which is the same material as that of the back pad 9. The back pad 9 is assembled as a seat back having the passenger's sitting posture detecting apparatus by covering the back pad 9 with a trim cover (not shown).

According to the seat back of the seat having the passenger's sitting posture detecting apparatus of the above structure, in a state where the back pad 9 is assembled, the passenger's sitting posture detecting apparatus 1 is accommodated in the opening 10, and the passenger's sitting posture detecting apparatus 1 can be seen from outside when the harness 6 is connected with the passenger's sitting posture detecting apparatus 1 through the connector 7 in the opening 10. Therefore, the connector 7 of the harness 6 can reliably be fitted into the passenger's sitting posture detecting apparatus 1 from outside with a simple operation.

Further, since the opening 10 of the back pad 9 is covered with the cover 11 and the trim cover is put thereon, it is possible to prevent an impact or the like from being applied to the passenger's sitting posture detecting apparatus 1 from outside, and to prevent recesses or the like from being generated on the trim cover, and the seat back can be assembled with excellent outer appearance.

As shown in FIGS. 2 and 4, in addition to the passenger's sitting posture detecting apparatus 1, a passenger sitting state detecting apparatus 12 is assembled into a seat face of the back pad 9.

When the harness 6 of the passenger's sitting posture detecting apparatus 1 is passed through the seat back frame 2, there is an adverse possibility that the harness 6 comes into contact with an edge or the like of a constituent member such as the seat back frame or the apparatus installing plate 5.

For this reason, this kind of harness is wired for conduction such that the harness is separated from the edge of the constituent member located around the harness by a clip.

Figure 5:
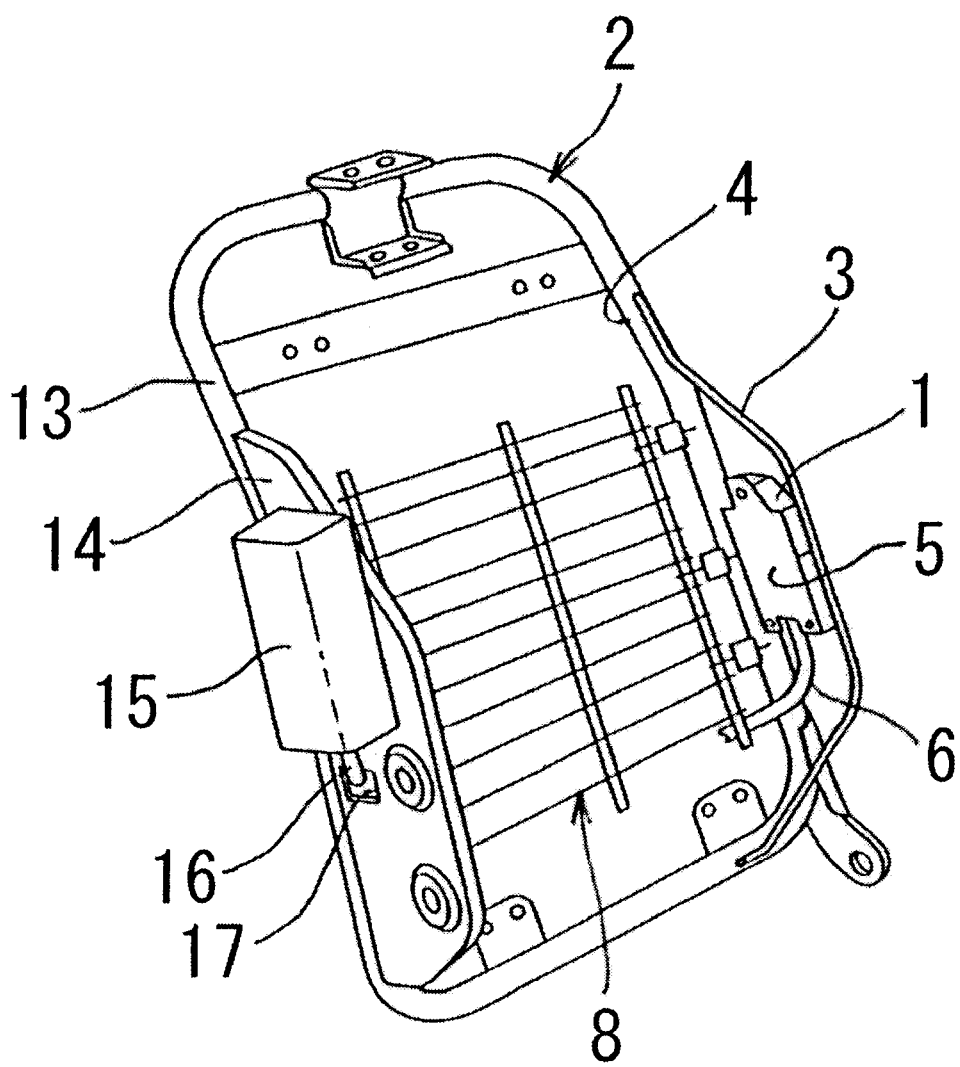
FIG. 5 is an explanatory view showing a harness wiring structure of the seat back frame when various apparatuses are mounted in outward direction.

The harness wiring structure will be explained with reference to FIGS. 5 to 7. The harness wiring structure according to the illustrated embodiment is applied to the wiring operation for conduction in which, a side plate 14 projecting from a main side frame 13 of the seat back frame 2 is defined as a mounting member, an air bag apparatus 15 is mounted to a plate face outer side of the side plate 4, a harness 16 of the air bag apparatus 15 is passed inside of an opening 17 provided in the side plate 4 as shown in FIG. 5.

Figure 6:
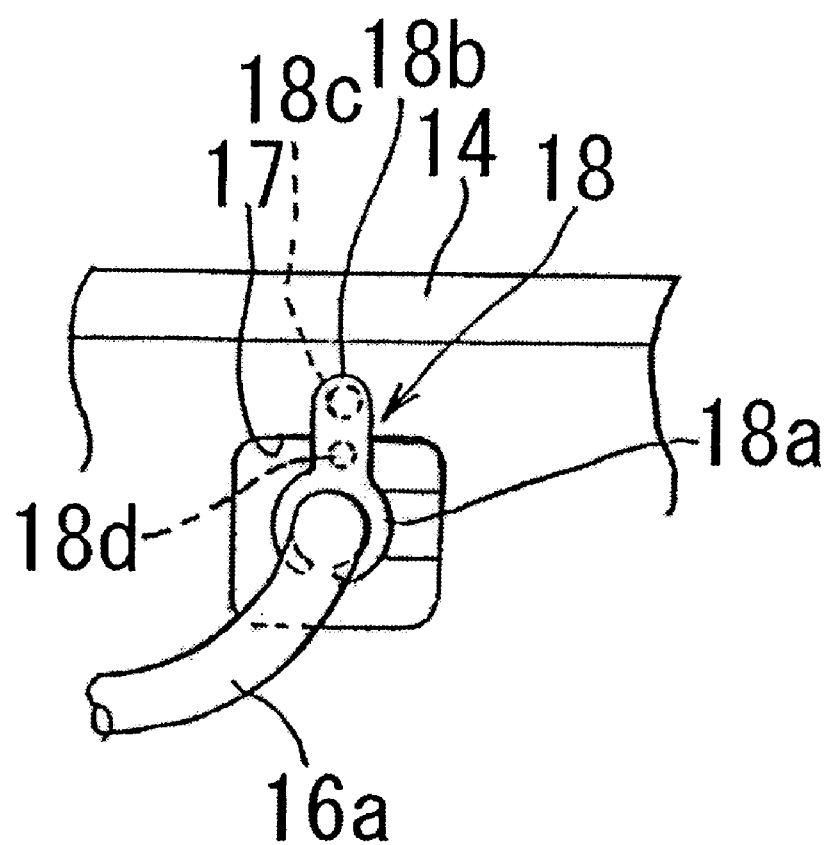
FIG. 6 is a plan view of the seat back frame for explaining the harness wiring structure of the present invention.

As shown in FIG. 6, the harness wiring structure comprises a holder portion 18a for pinching and holding the harness 16 on the axis, a holder arm 18b extending from the holder portion 18a and located inward of a side plate 14 from an edge of the opening 17 provided in the side plate 4, and a projection 18c provided on the side of a base of the holder arm 18b and fitted and fixed to a plate face of the side plate 14.

As a clip 18, one having each portion integrally formed of resin is used. The holder portion 18a is formed into a ring-shape whose one portion is opened as a pinching port of the harness 16. The holder arm 18b is formed into a projecting piece extending from the holder portion 18a. As shown in FIG. 7, the projection 18c is formed into an anchor-shape.

Figure 7:
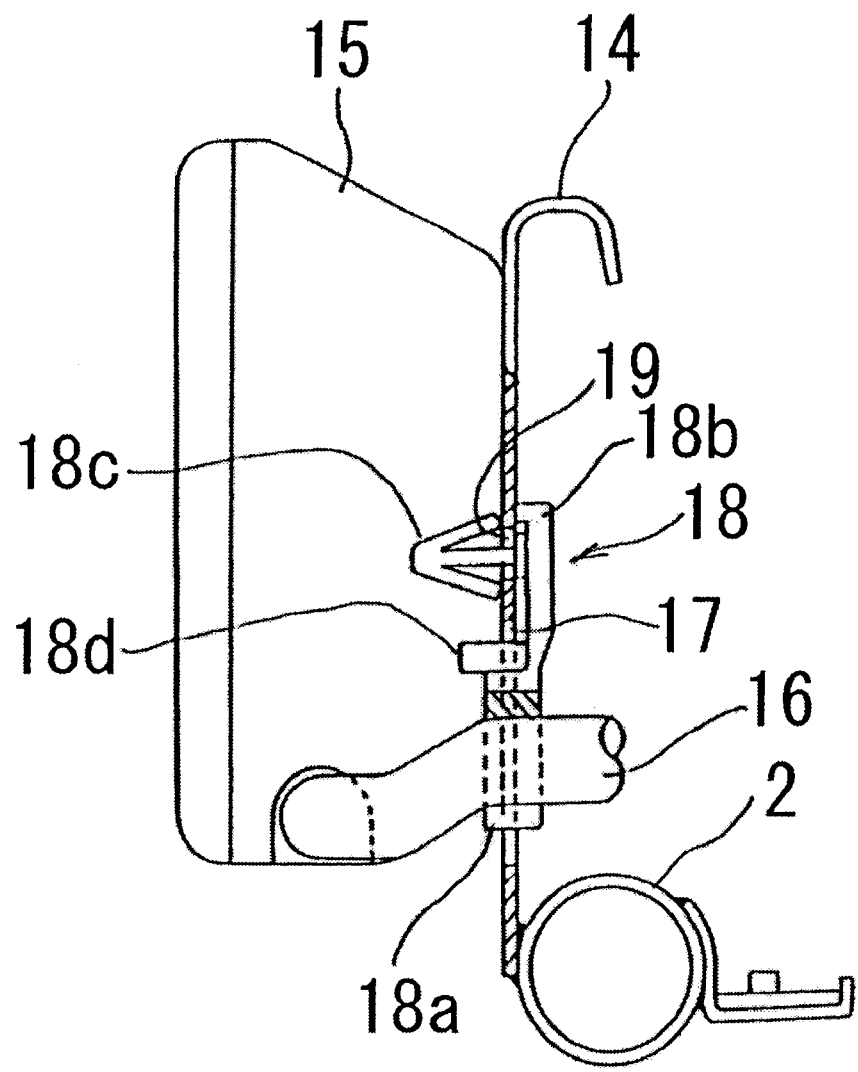
FIG. 7 is a sectional view of the seat back frame for explaining the harness wiring structure.
Figure 8:
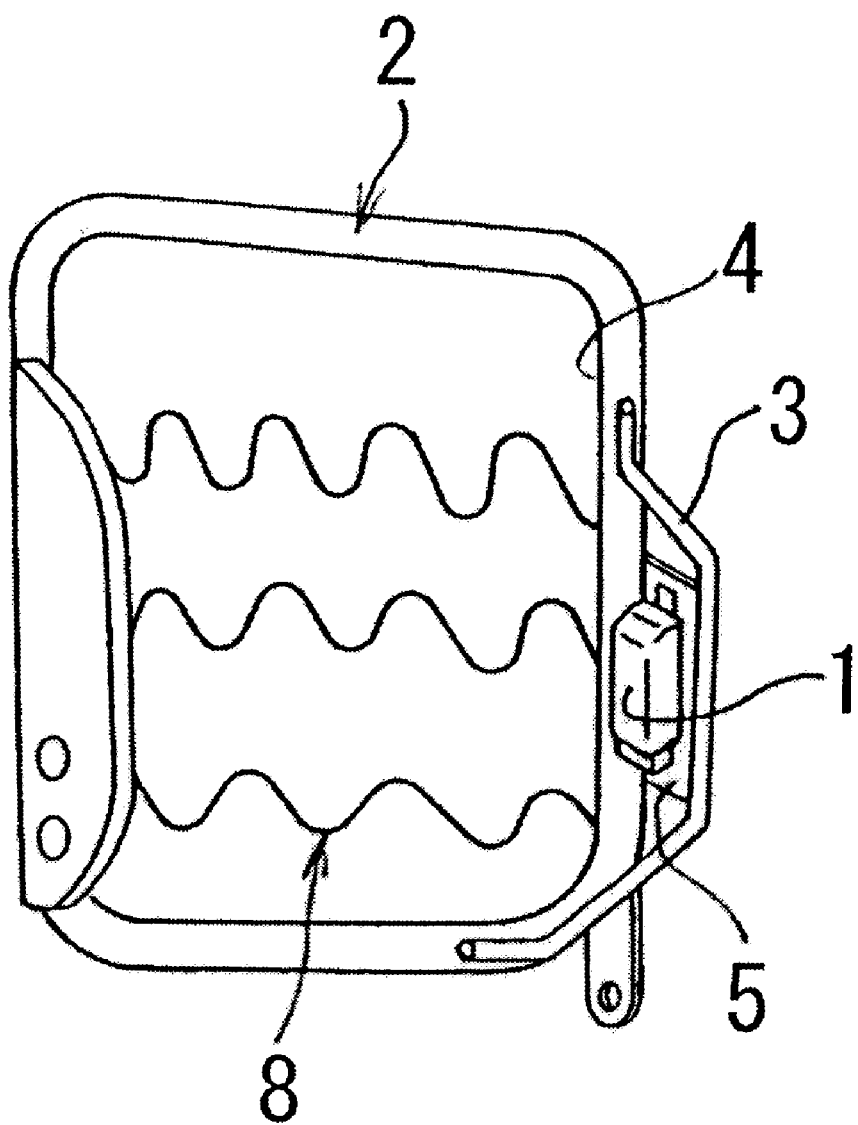
FIG. 8 is a perspective view of the seat back frame which is generally assumed as a seat having the passenger's sitting posture detecting apparatus.
Figure 9:
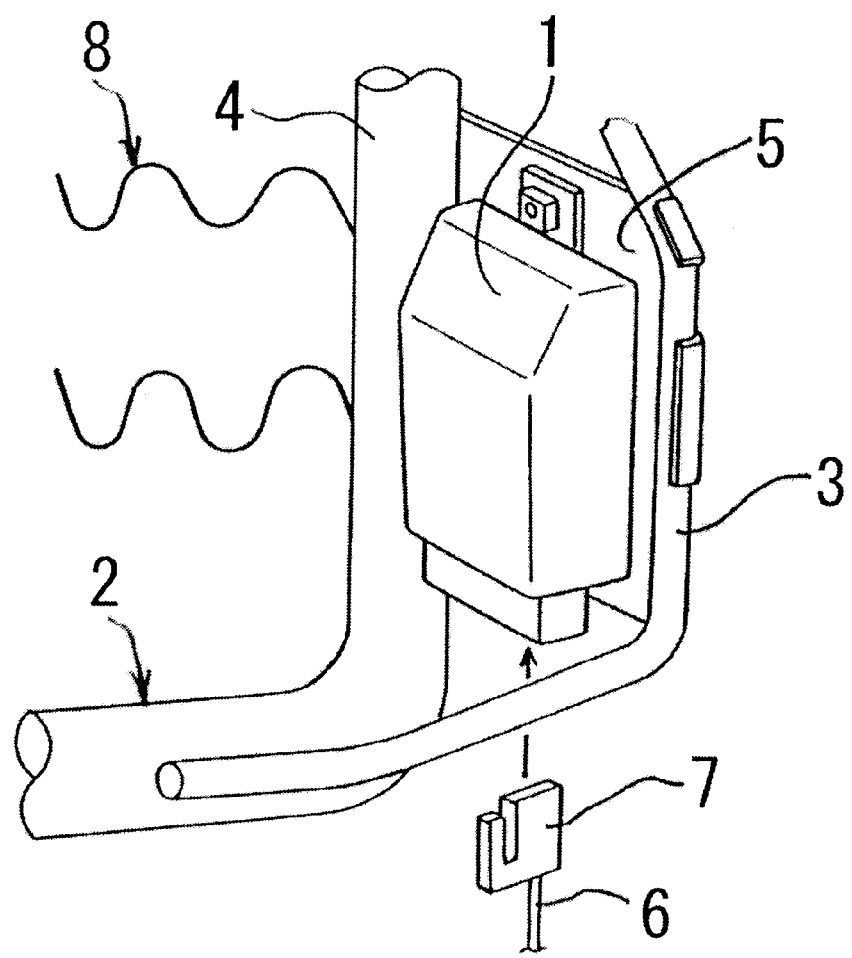
FIG. 9 is a perspective view of partially showing the seat back frame shown in FIG. 8.

As shown in FIG. 7, using the clip 18, the side plate 14 is defined as a mounting member, the projection 18c is mounted and fixed to a stopping hole 19 provided in the side plate 14 by press-fitting, the harness 16 is fitted to the holder portion 18a, the harness 16 is separated from the edge of the opening 17 and held by the holder arm 18b, thereby wiring the harness for conduction. With this operation, since the harness 16 does not come into contact with the edge of the opening 17, it is possible to prevent the harness 16 from rubbing against the edge of the opening 17 even if vibrations are generated when the automobile travels, and to reliably prevent a coating film of the harness 16 from being ripped.

It is preferable that the clip 18 is provided with an engaging pin 18d which is projected from an intermediate portion of the holder arm 18b and which abuts against the edge of the opening 17. Rotation of the clip is prevented and the clip can be fixed as a whole with this engaging pin 18d and thus, it is possible to completely prevent the harness 16 from coming into contact with the edge of the opening 17.

Although the embodiment has been explained based on the case in which the harness 16 of the air bag apparatus 15 is wired, the harness 6 of the passenger's sitting posture detecting apparatus 1 can of course be applied to other harnesses which electrically connect various other apparatuses.

Further, although the embodiment has been explained based on the edge of the opening 17 provided in the side plate 14, the harness wiring structure can similarly be applied for wiring operation in the vicinity of other constituent members assembled near a notch provided in the apparatus installing plate or the seat back frame.

As described above, according to the seat having the passenger's sitting posture detecting apparatus of the present invention, the seat is mounted on the side of the seat back so that the passenger's sitting posture detecting apparatus can be seen from outside, and the harness can be reliably assembled to the passenger's sitting posture detecting apparatus through the connector even in a state in which the back pad is assembled. Therefore, the seat having the passenger's sitting posture detecting apparatus of the present invention is useful.

According to the harness wiring structure of the present invention, the harness can be wired in a state where the harness is separated from the edge of the constituent member located near the harness through the clip of simple structure, it is possible to prevent the harness from being damaged or ripped by rubbing against the edge or the like which may be caused by vibrations when the automobile travels.

What is claimed is:

1. A seat having a passenger's sitting posture detecting apparatus, wherein the passenger's sitting posture detecting apparatus is mounted on a side of a seat back frame and outside of a frame, an opening is formed in a side of a back pad at a location corresponding to that of the passenger's sitting posture detecting apparatus, the passenger's sitting posture detecting apparatus is accommodated in the opening, a harness is assembled with a socket of the passenger's sitting posture detecting apparatus in the opening through a connector such that the harness can be connected to the socket, and the passenger's sitting posture detecting apparatus is mounted on a side of a seat back.

2. A seat having a passenger's sitting posture detecting apparatus according to claim 1, wherein the passenger's sitting posture detecting apparatus is accommodated in the opening, the harness is assembled with the passenger's sitting posture detecting apparatus in the opening through the connector such that the harness can be connected to the passenger's sitting posture detecting apparatus, and the opening is covered with a cover which is fitted into the opening.

3. A harness wiring structure in a seat applied to a wiring operation for bringing a harness which electrically connects various apparatuses into conduction in a vicinity of an edge of a mounting member, comprising a clip having a holder for pinching and holding the harness on its axis, a holder arm extended from the holder and located inward of a face from the edge of the mounting member, and a projection provided on a base of the holder arm and fitted and fixed to a plate face of the mounting member, wherein the harness is held and brought into conduction such that the harness is separated from the edge of the mounting member through the clip.

4. A harness wiring structure in a seat according to claim 3, further comprising an engaging pin projecting from an intermediate portion of the holder arm, wherein the engaging pin is brought into abutment against the edge of the mounting member to fix the clip so that the clip does not rotate.

* * * * *